(12) United States Patent
Fuchizaki et al.

(10) Patent No.: US 8,149,538 B2
(45) Date of Patent: Apr. 3, 2012

(54) MAGNETIC HEAD FOR PERPENDICULAR RECORDING AND DISK DRIVE WITH THE SAME

(75) Inventors: Yoshinobu Fuchizaki, Ome (JP); Tomoko Taguchi, Kunitachi (JP)

(73) Assignee: Kabushiki Kaisha Toshiba (JP)

( * ) Notice: Subject to any disclaimer, the term of this patent is extended or adjusted under 35 U.S.C. 154(b) by 9 days.

(21) Appl. No.: 12/836,415

(22) Filed: Jul. 14, 2010

(65) Prior Publication Data
US 2011/0075294 A1    Mar. 31, 2011

(30) Foreign Application Priority Data
Sep. 29, 2009   (JP) .................................. 2009-225032

(51) Int. Cl.
*G11B 5/147* (2006.01)
(52) U.S. Cl. ............................... 360/125.3; 360/125.13
(58) Field of Classification Search ............... 360/125.3, 360/125.02, 125.71, 125.72, 128, 125.13, 360/125.14, 125.15
See application file for complete search history.

(56) References Cited

U.S. PATENT DOCUMENTS

| | | | | |
|---|---|---|---|---|
| 3,940,797 A * | 2/1976 | Brock et al. | .................... | 360/319 |
| 6,118,625 A * | 9/2000 | Heinz et al. | .................... | 360/121 |
| 7,002,775 B2 * | 2/2006 | Hsu et al. | .................... | 360/125.03 |
| 7,068,453 B2 * | 6/2006 | Terris et al. | .................... | 360/59 |
| 7,295,401 B2 * | 11/2007 | Jayasekara et al. | ........ | 360/125.08 |
| 7,310,203 B2 * | 12/2007 | Yoshida et al. | ........... | 360/125.33 |
| 7,440,230 B2 * | 10/2008 | Hsu et al. | .................... | 360/125.3 |
| 7,573,683 B1 * | 8/2009 | Benakli et al. | ................ | 360/319 |
| 7,586,715 B2 * | 9/2009 | Koyama et al. | ............... | 360/321 |
| 7,609,479 B2 * | 10/2009 | Sasaki et al. | ................ | 360/125.3 |
| 7,639,454 B2 * | 12/2009 | Lim et al. | .................... | 360/125.3 |
| 7,715,152 B2 * | 5/2010 | Okada et al. | .................. | 360/319 |
| 7,889,456 B2 * | 2/2011 | Jiang et al. | ............... | 360/125.08 |
| 7,920,358 B2 * | 4/2011 | Jiang et al. | ............... | 360/125.17 |
| 7,920,359 B2 * | 4/2011 | Maruyama et al. | ........ | 360/125.3 |

(Continued)

FOREIGN PATENT DOCUMENTS

JP    04-098608    3/1992

(Continued)

OTHER PUBLICATIONS

Notice of Reasons for Rejection mailed by Japan Patent Office on Sep. 7, 2010 in the corresponding Japanese Patent Application No. 2009-225032.

*Primary Examiner* — Brian Miller
(74) *Attorney, Agent, or Firm* — Knobbe, Martens, Olson & Bear LLP

(57) ABSTRACT

According to one embodiment, a magnetic head for perpendicular recording includes a slider includes a facing surface, and a head section on the slider. The head section includes a main pole, a recording coil configured to excite the main pole, a write/shield pole opposed to a trailing side of the main pole across a write gap, and side shields disposed individually on opposite sides of the main pole transversely relative to a track to face side faces of the main pole and magnetically separated from the main pole. That part of a side face of each of the side shields opposed to each corresponding side face of the main pole which is located at the shortest distance from a leading end of each of the side faces of the main pole, on the facing surface, includes a permeability lower than that of the other part of the side shield.

8 Claims, 10 Drawing Sheets

U.S. PATENT DOCUMENTS

| | | | |
|---|---|---|---|
| 7,969,684 B2 * | 6/2011 | Le et al. | 360/125.3 |
| 7,978,431 B2 * | 7/2011 | Han et al. | 360/125.3 |
| 7,990,653 B2 * | 8/2011 | Mochizuki et al. | 360/125.09 |
| 2003/0193742 A1 * | 10/2003 | Matono et al. | 360/126 |
| 2005/0068669 A1 * | 3/2005 | Hsu et al. | 360/125 |
| 2006/0002017 A1 * | 1/2006 | Taguchi et al. | 360/125 |
| 2006/0002019 A1 * | 1/2006 | Guthrie et al. | 360/125 |
| 2007/0268626 A1 * | 11/2007 | Taguchi et al. | 360/126 |
| 2009/0168241 A1 * | 7/2009 | Mochizuki et al. | 360/125.03 |
| 2009/0262464 A1 * | 10/2009 | Gill et al. | 360/319 |
| 2010/0188783 A1 * | 7/2010 | Taguchi | 360/319 |
| 2010/0315747 A1 * | 12/2010 | Matsumoto et al. | 360/246.2 |
| 2011/0075294 A1 * | 3/2011 | Fuchizaki et al. | 360/123.12 |
| 2011/0128652 A1 * | 6/2011 | Taguchi et al. | 360/123.12 |

FOREIGN PATENT DOCUMENTS

| | | |
|---|---|---|
| JP | 10-112006 | 4/1998 |
| JP | 10-112006 A | 4/1998 |
| JP | 2004-326990 | 11/2004 |
| JP | 2004-326990 A | 11/2004 |
| JP | 2005-190518 A | 7/2005 |
| JP | 2006-185558 A | 7/2006 |
| JP | 2006-252756 A | 9/2006 |
| JP | 2007-052904 A | 3/2007 |
| JP | 2007-294059 | 11/2007 |
| JP | 2007-294059 A | 11/2007 |
| JP | 2009-4089 | 1/2009 |
| JP | 2009-004089 A | 1/2009 |

* cited by examiner

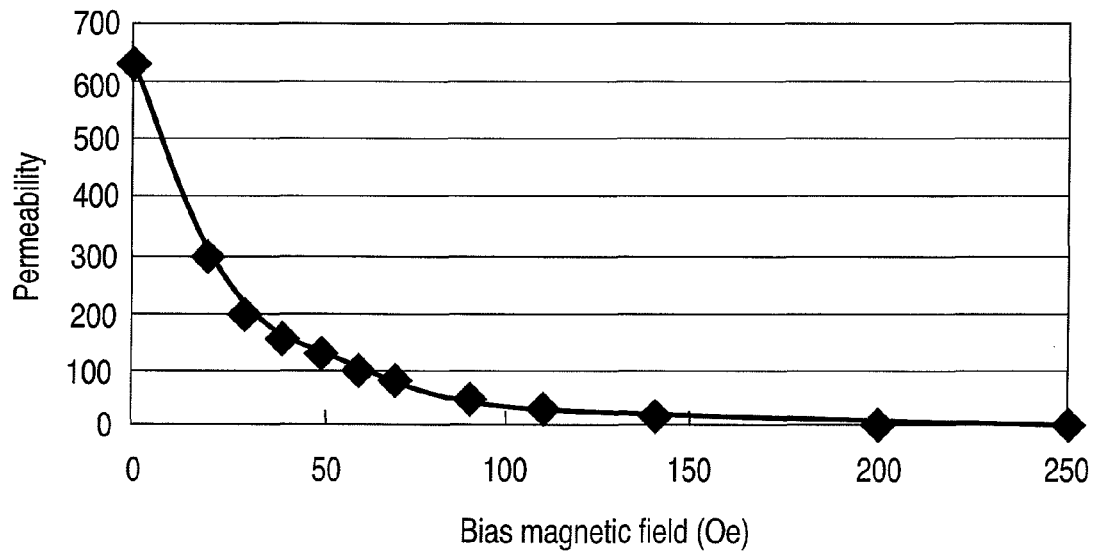
F I G. 12
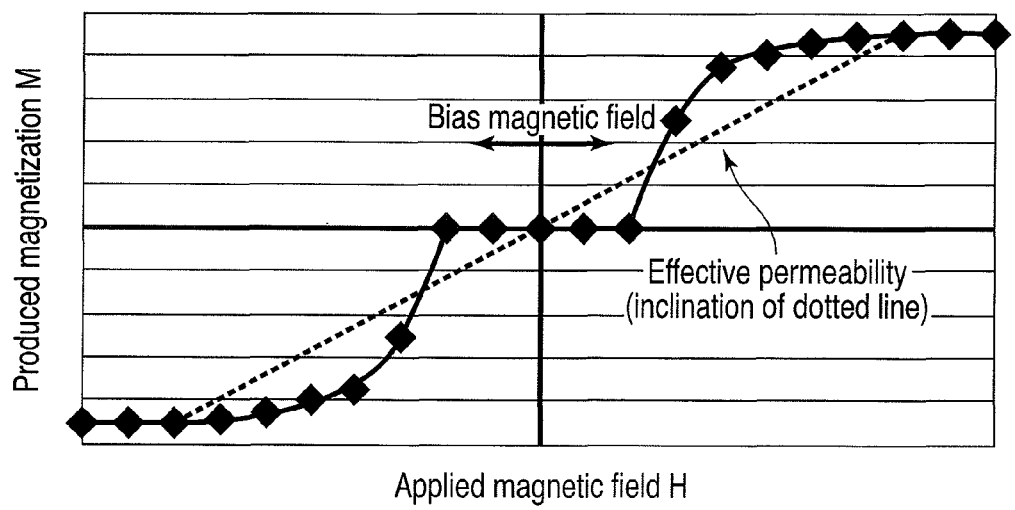
F I G. 13

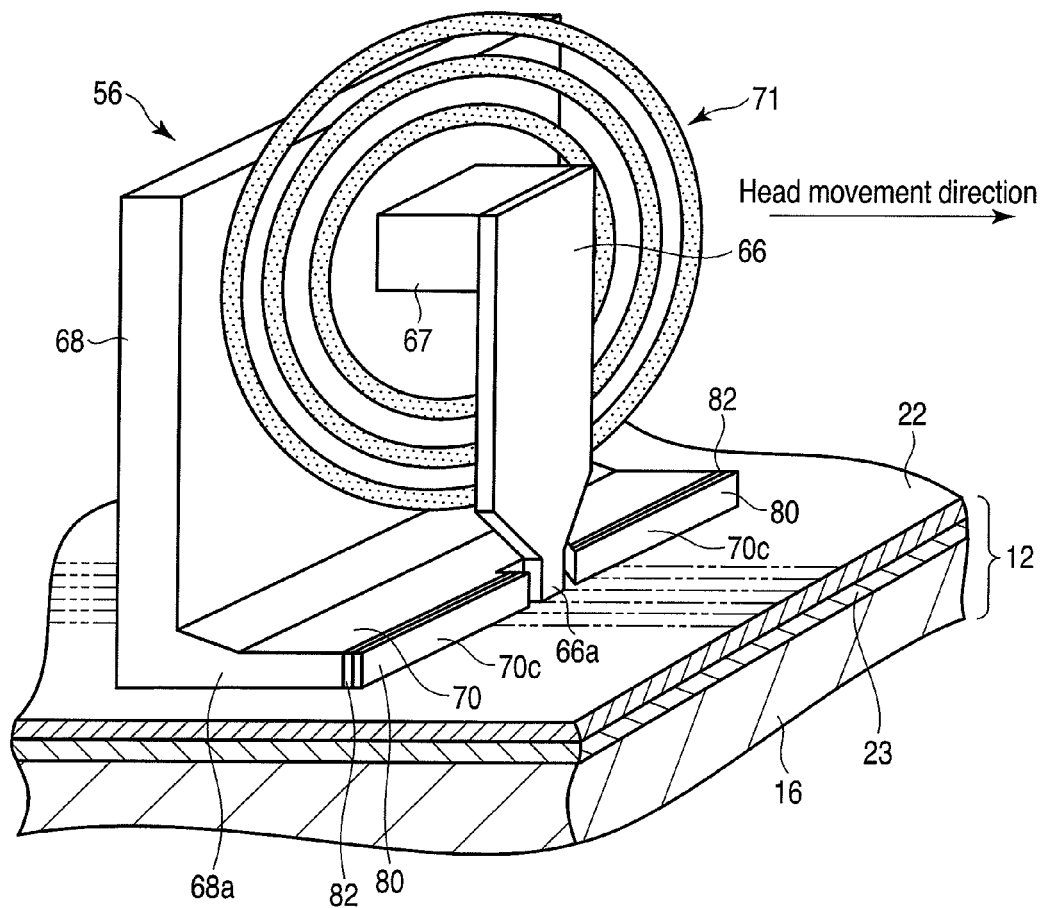
F I G. 14
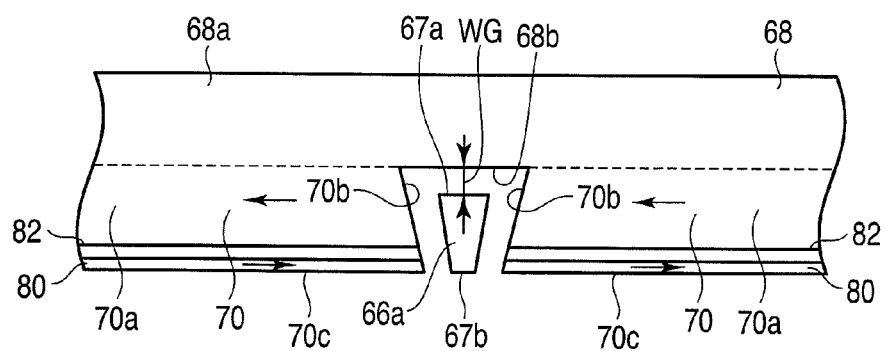
F I G. 15

MAGNETIC HEAD FOR PERPENDICULAR RECORDING AND DISK DRIVE WITH THE SAME

CROSS-REFERENCE TO RELATED APPLICATIONS

This application is based upon and claims the benefit of priority from Japanese Patent Application No. 2009-225032, filed Sep. 29, 2009; the entire contents of which are incorporated herein by reference.

FIELD

Embodiments described herein relate generally to a magnetic head for perpendicular magnetic recording used in a disk drive and the disk drive provided with the magnetic head.

BACKGROUND

A disk drive, such as a hard disk drive (HDD), comprises a magnetic disk, spindle motor, magnetic head, and carriage assembly. The magnetic disk is disposed in a case. The spindle motor supports and rotates the disk. The magnetic head reads and writes information to and from the disk. The carriage assembly supports the head for movement relative to the disk. The magnetic head comprises a slider mounted on a suspension of the carriage assembly and a head section. The head section comprises a recording head for writing and a reproducing head for reading.

In recent years, a magnetic head for perpendicular magnetic recording has been proposed to increase the recording density and capacity or reduce the size of a magnetic disk drive. In the magnetic head of this type, a recording head comprises a main pole, write/shield pole, and coil. The main pole produces a perpendicular magnetic field. The write/shield pole is located on the trailing side of the main pole with a write gap between the poles and closes a magnetic path between itself and a magnetic disk. The coil serves to pass a magnetic flux through the main pole. Side shields that are magnetically coupled to the write/shield pole are arranged individually on the opposite sides of the main pole transversely relative to the tracks. An end portion of the main pole is partially located between the side shields (e.g., Jpn. Pat. Appln. KOKAI Publications Nos. 2009-4089 and 2007-294059).

A recording magnetic field is applied to the magnetic disk from just below the main pole, whereupon record patterns are perpendicularly recorded along tracks that are almost as wide as the write gap.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 12 is an exemplary diagram showing the relationship between bias magnetic fields and permeability;

FIG. 13 is an exemplary diagram showing the relationship between an applied magnetic field H and produced magnetization M;

FIG. 14 is an exemplary perspective view typically showing a recording head of a magnetic head according to a third embodiment; and FIG. 15 is an exemplary plan view of the recording head of the third embodiment taken from the disk-facing side of a slider.

DETAILED DESCRIPTION

Various embodiments will be described hereinafter with reference to the accompanying drawings. In general, according to one embodiment, a magnetic head for perpendicular recording comprises a slider comprising a facing surface opposed to the recording medium; and a head section on the slider, configured to perform information processing for the recording medium. The head section comprises a main pole configured to apply a recording magnetic field perpendicular to the recording medium, a recording coil configured to excite the main pole, a write/shield pole opposed to a trailing side of the main pole across a write gap, and side shields disposed individually on opposite sides of the main pole transversely relative to a track to face side faces of the main pole and magnetically separated from the main pole, that part of a side face of each of the side shields opposed to each corresponding side face of the main pole which is located at the shortest distance from a leading end of each of the side faces of the main pole, on the facing surface, having a permeability lower than that of the other part of the side shield.

A hard disk drive (HDD) according to a first embodiment will now be described in detail with reference to the accompanying drawings.

Figure 1:
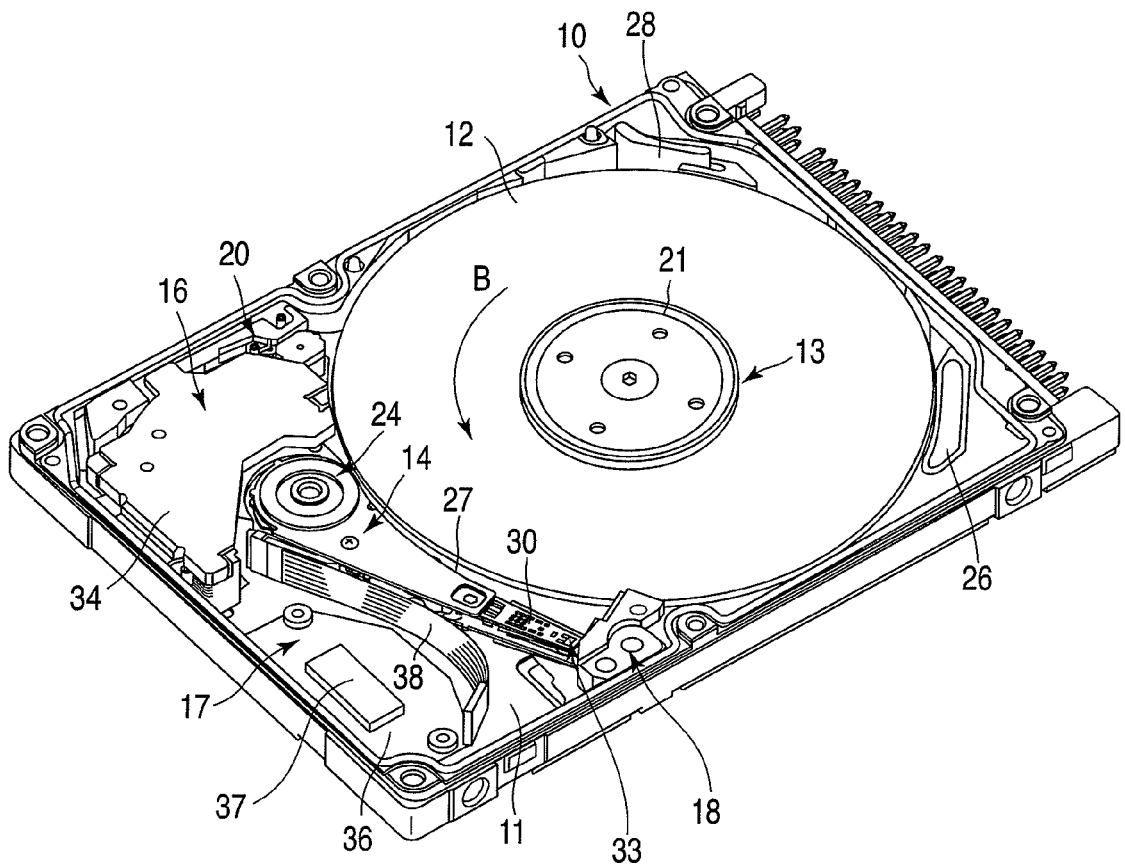
FIG. 1 is an exemplary perspective view showing an HDD according to a first embodiment.
Figure 2:
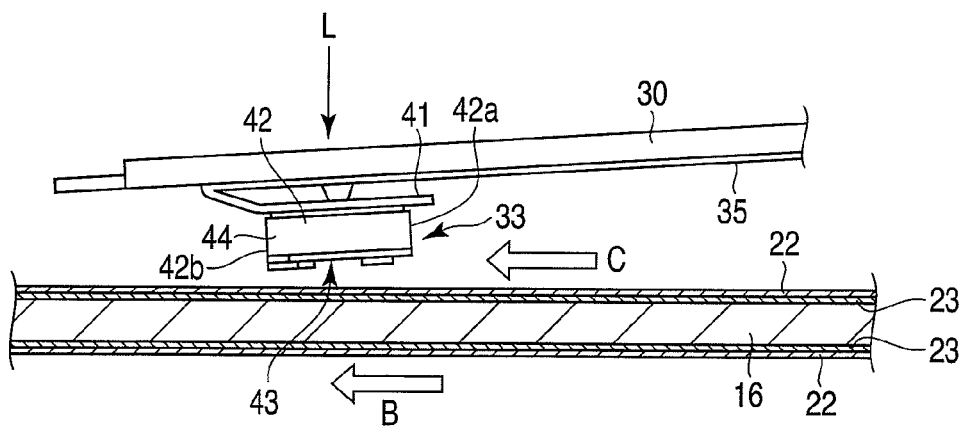
FIG. 2 is an exemplary side view showing a magnetic head and suspension in the HDD.

FIG. 1 shows the internal structure of the HDD with its top cover off, and FIG. 2 shows a flying magnetic head. As shown in FIG. 1, the HDD comprises a case 10. The case 10 comprises a base 11 in the form of an open-topped rectangular box and a top cover (not shown) in the form of a rectangular plate. The top cover is attached to the base by screws so as to close the top opening of the base. Thus, the case 10 is kept airtight inside and can open to the outside through a breather filter 26 only. The base 11 and top cover are formed of a metallic material, such as aluminum, iron, stainless steel, or cold-rolled carbon steel.

A magnetic disk 12 for use as a recording medium and a mechanical unit are arranged on the base 11. The mechanical unit comprises a spindle motor 13, a plurality of (e.g., two) magnetic heads 33, head actuator 14, and voice coil motor (VCM) 15. The spindle motor 13 supports and rotates the magnetic disk 12. The magnetic heads 33 write information to and read information from the disk 12. The head actuator 14 supports the heads 33 for movement relative to the surfaces of the disk 12. The VCM 15 rotates and positions the head actuator. A ramp load mechanism 18, inertial latch mechanism 20, and board unit 17 are also arranged on the base 11. The ramp load mechanism 18 holds the magnetic heads 33 in positions off the magnetic disk 12 when the heads 33 are moved to the outermost periphery of the disk 12. The inertial latch mechanism 20 holds the head actuator 14 in a retracted position if the HDD is jolted, for example. Electronic components, such as a preamplifier, head IC, etc., are mounted on the board unit 17.

A circuit board unit (not shown) for controlling the operations of the spindle motor 13, VCM 15, and magnetic heads 33 through the board unit 17 is attached to the outer surface of the base 11 by screws and opposed to a bottom wall of the base 11.

As shown in FIGS. 1 and 2, the magnetic disk 12 is constructed as a double-layered perpendicular recording medium. The disk 12 has a diameter of about 2.5 inches and comprises a substrate 16 of a nonmagnetic material. A soft magnetic underlayer 23 and perpendicular magnetic recording layer 22 are sequentially formed on each surface of the substrate 16, and in addition, a protective film (not shown) is formed on the recording layer 22. The recording layer 22 has an easy axis perpendicular to the disk surfaces.

As shown in FIG. 1, the magnetic disk 12 is coaxially fitted on a hub of the spindle motor 13 and clamped and fixed to the hub by a clamp spring 21, which is attached to the upper end of the hub by screws. The disk 12 is rotated at a predetermined speed in the direction of arrow B by the spindle motor 13 for use as a drive motor.

The head actuator 14 comprises a bearing 24 fixed on the bottom wall of the base 11 and a plurality of arms 27 extending from the bearing 24. The arms 27 are located parallel to the surfaces of the magnetic disk 12 and at predetermined intervals and extend in the same direction from the bearing 24. The head actuator 14 comprises elastically deformable suspensions 30 each in the form of an elongated plate. Each suspension 30 has its proximal end fixed to the distal end of its corresponding arm 27 by spot welding or adhesive bonding and extends from the arm. Alternatively, each suspension 30 may be formed integrally with its corresponding arm 27. A magnetic head 33 is supported on an extended end of each suspension 30. Each arm 27 and suspension 30 constitute a head suspension, and the head suspension and each magnetic head 33 constitute a head suspension assembly.

As shown in FIG. 2, each magnetic head 33 comprises a substantially cuboid slider 42 and read/write head section 44 on an outflow end (trailing end) of the slider. Each head 33 is fixed to a gimbal spring 41 on the distal end portion of each corresponding suspension 30. A head load L directed to the surface of the magnetic disk 12 is applied to each head 33 by the elasticity of the suspension 30. The two arms 27 are located parallel to each other with a predetermined space therebetween, and the suspensions 30 and magnetic heads 33 mounted on these arms face one another with the magnetic disk 12 between them.

Each magnetic head 33 is electrically connected to a main FPC 38 (described later) through a relay flexible printed circuit board (relay FPC) 35 fixed to the suspension 30 and arm 27.

As shown in FIG. 1, the board unit 17 comprises an FPC body 36, formed of a flexible printed circuit board, and the main FPC 38 extending from the FPC body. The FPC body 36 is fixed on the bottom surface of the base 11. Electronic components, such as a preamplifier, head IC, etc., are mounted on the FPC body 36. An extended end of the main FPC 38 is connected to the head actuator 14 and also to each magnetic head 33 through each relay FPC 35.

The VCM 15 comprises a support frame (not shown) extending from the bearing 24 and a voce coil supported on the frame. When the head actuator 14 is incorporated in the base 11, the voice coil is located between a pair of yokes 34 that are fixed on the base 11. Thus, the voice coil, along with the yokes and a magnet fixed to the yokes, constitute the VCM 15.

If the voice coil of the VCM 15 is energized with the magnetic disk 12 in rotation, the head actuator 14 pivots so that each magnetic head 33 is moved to and positioned on a desired track of the disk 12. When this is done, the head 33 is moved radially relative to the disk 12 between the inner and outer peripheral edge portions of the disk.

Figure 3:
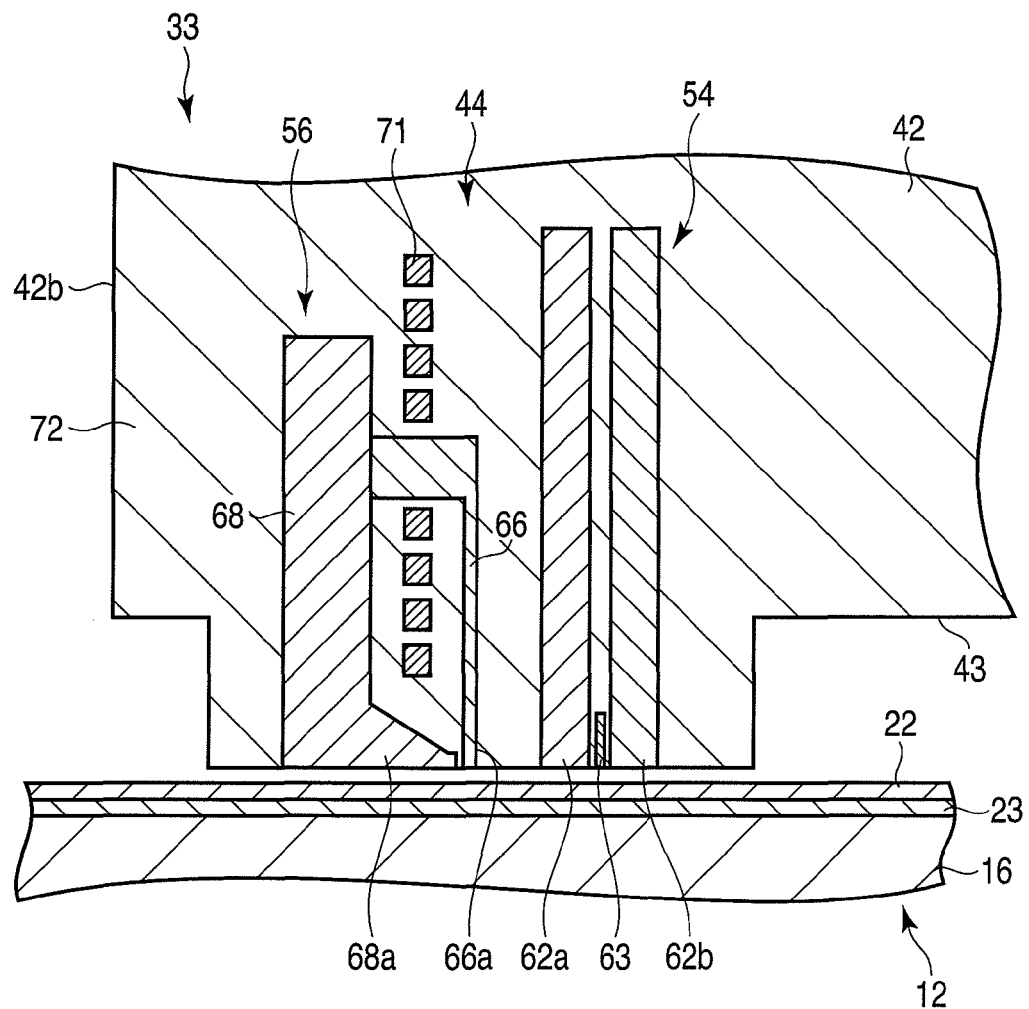
FIG. 3 is an exemplary enlarged sectional view showing a head section of the magnetic head.
Figure 4:
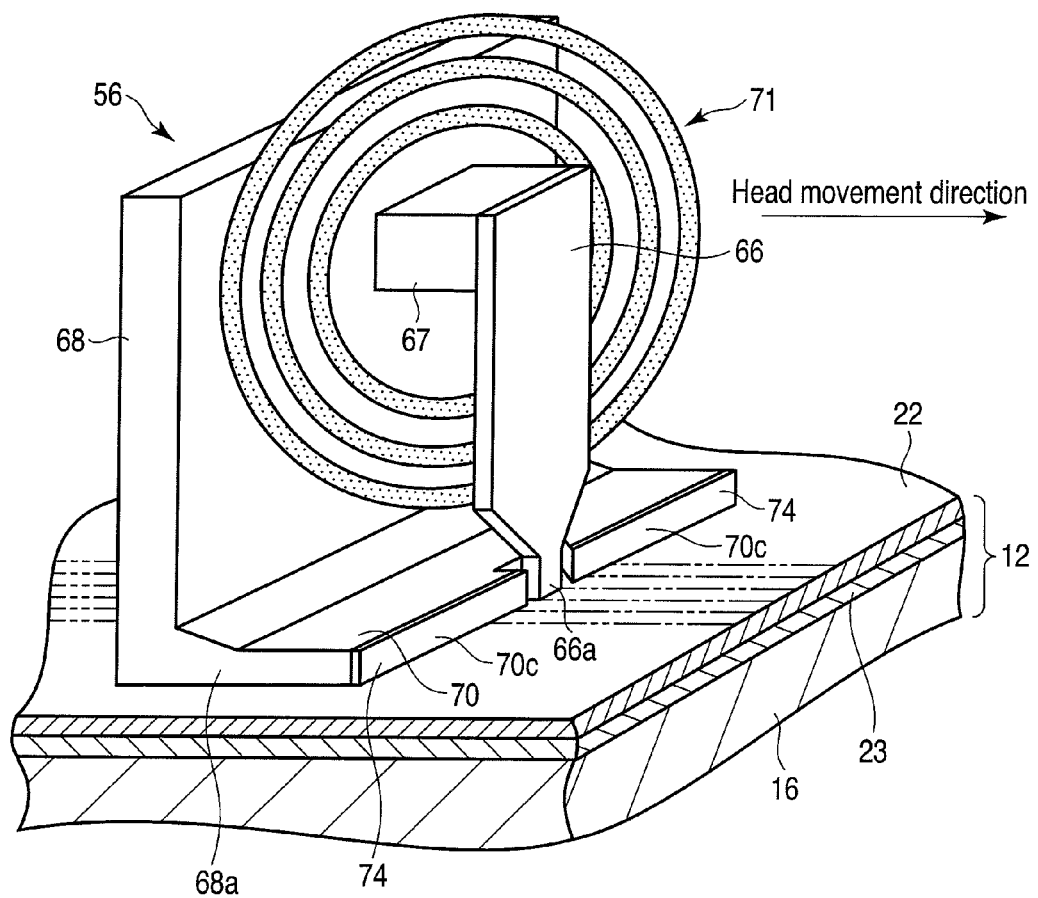
FIG. 4 is an exemplary perspective view typically showing a magnetic disk and a recording head of the magnetic head.
Figure 5:
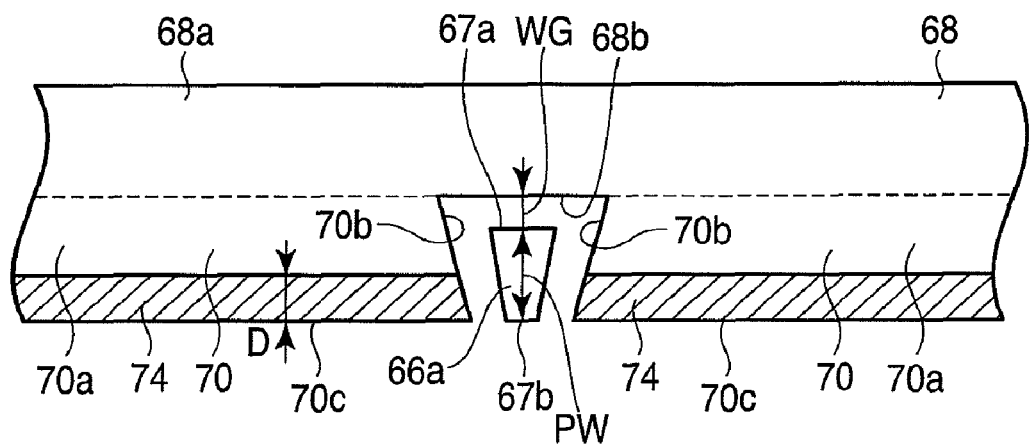
FIG. 5 is an exemplary plan view of the recording head taken from the disk-facing side of a slider.

The following is a detailed description of a configuration of the magnetic head 33. FIG. 3 is an enlarged sectional view of the head section 44 of the head 33, FIG. 4 is a perspective view typically showing a recording head of the head section, and FIG. 5 is a plan view of the recording head taken from the disk-facing side.

As shown in FIGS. 2 and 3, the magnetic head 33 is constructed as a flying head, which comprises the substantially cuboid slider 42 and head section 44 formed on the outflow-side (or trailing-side) end portion of the slider. The slider 42 is formed of, for example, a ceramic sintered compact of alumina and titanium carbide (AlTiC), and the head section 44 is formed by laminating thin films.

The slider 42 has a rectangular disk-facing surface or air-bearing surface (ABS) 43 that faces the surface of the magnetic disk 12. The slider 42 is caused to fly by airflow C that is produced between the disk surface and the disk-facing surface 43 as the disk 12 rotates. The direction of airflow C is coincident with the direction of rotation B of the disk 12. The slider 42 is located above the surface of the disk 12 in such a manner that the longitudinal direction of the disk-facing surface 43 is substantially coincident with the direction of airflow C.

The slider 42 comprises a leading end 42a on the inflow side of airflow C and trailing end 42b on the outflow side. The disk-facing surface 43 of the slider 42 is formed with a leading step, trailing step, side steps, negative-pressure cavity, etc.

As shown in FIG. 3, the head section 44 comprises a reproducing head 54 and recording head 56 formed on the trailing end 42b of the slider 42 by a thin-film process, and is formed as a separate-type magnetic head of which the recording and reproducing heads are separate.

The reproducing head 54 comprises a magnetic film 63 with a magnetoresistive effect and soft magnetic shield films 62a and 62b arranged on the trailing and leading sides, respectively, of the magnetic film so that the magnetic film is sandwiched between them. The respective lower ends of the magnetic film 63 and shield films 62a and 62b are exposed on the disk-facing surface 43 of the slider 42. The reproducing head 54 reproduces information recorded in the magnetic disk 12.

The recording head 56 is provided on the trailing end side of the slider 42 with respect to the reproducing head 54. The recording head 56 is constructed as a single-pole head having its write/shield pole on the trailing end side. As shown in FIGS. 3 and 4, the recording head 56 comprises a main pole 66, write/shield pole (return pole) 68, junction 67, and recording coil 71. The main pole 66 is formed of a soft magnetic material with a high permeability and high saturation magnetic flux density that produces a recording magnetic field perpendicular to the surfaces of the magnetic disk 12. The write/shield pole 68 is located on the trailing side of the main pole 66 and configured to efficiently close a magnetic path through the soft magnetic underlayer 23 just below the main pole. The junction 67 connects an upper part of the main pole 66 to the write/shield pole 68. The recording coil 71 is located so as to wind around the magnetic path including the main pole 66 and write/shield pole 68 in order to pass a magnetic flux through the main pole.

As shown in FIGS. 3 to 5, the main pole 66 extends at right angles to the surfaces of the magnetic disk 12. The lower end portion of the main pole 66 on the disk side is tapered toward the disk 12, and its tip portion 66a is in the form of a column narrower than the other part. As shown in FIG. 5, the tip portion 66a of the main pole 66 has, for example, a trapezoidal cross section and comprises a trailing end face 67a, leading end face 67b, and opposite side faces. The trailing end face 67a is located on the trailing end side and has a predetermined width. The leading end face 67b is located opposite the trailing end face and is narrower than the trailing end face. The lower end face of the main pole 66 is exposed on the disk-facing surface 43 of the slider 42. The width of the trailing end face 67a is substantially equal to the track width of the magnetic disk 12.

The write/shield pole 68 is substantially L-shaped and its lower end portion 68a has an elongated rectangular shape. The lower end face of the write/shield pole 68 is exposed on the disk-facing surface 43 of the slider 42. A leading end face 68b of the lower end portion 68a extends transversely relative to the tracks of the magnetic disk 12. The leading end face 68b is opposed to the trailing end face 67a of the main pole 66 in a parallel manner with a write gap WG therebetween.

As shown in FIGS. 4 and 5, the recording head 56 comprises a pair of side shields 70 disposed individually on the longitudinally opposite sides of the write gap WG of the main pole 66, that is, on the opposite sides of the main pole transversely relative to the tracks. On the disk-facing surface 43, the side shields 70 are magnetically separated from the main pole 66. The side shields 70 are formed of a soft magnetic material with a high permeability and high saturation magnetic flux density, such as an iron- or cobalt-based alloy. The side shields 70 are formed integrally with the lower end portion 68a of the write/shield pole 68 and extend from the leading end face 68b of the lower end portion 68a toward the leading end side of the slider 42.

Each of the side shields 70 comprises a bottom surface 70a, side face 70b, leading end face 70c, and top surface. The bottom surface 70a is exposed on the disk-facing surface 43 and faces the magnetic disk 12. The side face 70b rises from the bottom surface and faces its corresponding side face of the main pole 66 across a gap. The leading end face 70c rises from the bottom surface 70a and extends transversely relative to the tracks. The top surface is located opposite the bottom surface.

As shown in FIGS. 4 and 5, a low-permeability layer 74 is formed on the leading end edge of each side shield 70 and extends throughout the length of the side shield 70 transversely relative to the tracks. The low-permeability layer 74 has a permeability lower than that of the other part. In the present embodiment, the low-permeability layer 74 is formed of an alloy containing, for example, iron, cobalt, nickel, or zirconium, such that its permeability μ is less than 100. If a length PW of the tip portion 66a of the main pole 66 is 60 nm, a thickness D of the low-permeability layer 74 is adjusted to about 30 nm. Thus, that part of the side face 70b of each side shield opposed to the corresponding side face of the main pole 66 which is located at the shortest distance from the leading end of the side face of the main pole, on the disk-facing surface, has a permeability lower than that of the other part of the side shield.

The low-permeability layer 74 is not limited to the case where it is formed on the entire leading end of each side shield 70, and need only be disposed on at least that part of the side shield which is located at the shortest distance from the leading end of the side face of the main pole, on the disk-facing surface.

As shown in FIG. 3, a protective insulating film 72 covers the entire reproducing head 54 and recording head 56 except those parts which are exposed on the disk-facing surface 43 of the slider 42. The insulating film 72 defines a contour of the head section 44.

If the VCM 15 is powered, according to the HDD constructed in this manner, the head actuator 14 pivots, whereupon each magnetic head 33 is moved to and positioned on a desired track of the magnetic disk 12. Further, the magnetic head 33 is caused to fly due to airflow C that is produced between the disk surface and the disk-facing surface 43 as the disk 12 rotates. When the HDD is operating, the disk-facing surface 43 of the slider 42 is opposed to the disk surface across a gap. As shown in FIG. 2, the head 33 flies in such an inclined posture that the recording head 56 of the head section 44 is located closest to the disk surface. In this state, recorded information is read from the magnetic disk 12 by the reproducing head 54, while information is written by the recording head 56.

In the writing operation, the main pole 66 is excited by the recording coil 71 to apply a recording magnetic field perpendicular to the recording layer 22 of the magnetic disk 12 just below the main pole, whereupon information is recorded with a desired track width. In doing this, the information can be prevented from being written to adjacent tracks by means of the side shields 70 on the opposite sides of the tip portion 66a of the main pole 66. Further, that part of the side face 70b of each side shield opposed to the corresponding side face of the main pole 66 which is located at the shortest distance from the leading end of the side face of the main pole, on the disk-facing surface, has a permeability lower than that of the other part of the side shield. Therefore, a so-called return magnetic field that is directed reversely to the direction of a magnetic field for the medium surface just below the main pole 66 can be prevented from being concentrated on the leading end portion of each side shield 70. Accordingly, such a phenomenon can be avoided that information recorded in the adjacent tracks is erased or degraded by the return magnetic field. Thus, the on-track signal quality can be maintained or improved, fringing fields that are leaked out to the adjacent tracks can be reduced, and the density of magnetic disk recording can be increased.

Figure 6:
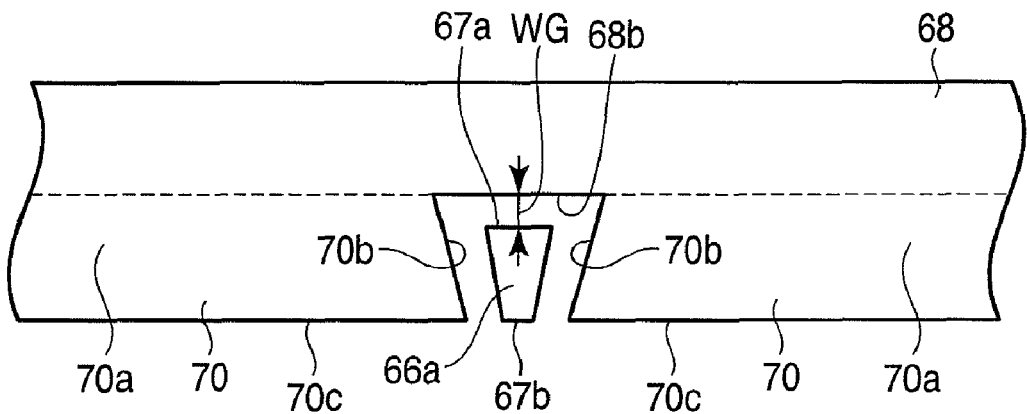
FIG. 6 is an exemplary plan view of a recording head according to a related art example taken from the disk-facing side of a slider.

The magnetic head according to the present embodiment and one according to a comparative example were prepared, and their respective performances were compared. In the magnetic head of the comparative example, as shown in FIG. 6, each side shield 70 does not comprise a low-permeability layer and is entirely formed of a high-permeability material. Therefore, that part of the side face of each side shield which is located at the shortest distance from the leading end of the side face of the main pole, on the disk-facing surface, has the same permeability as the other part of the side shield.

Figure 7A:
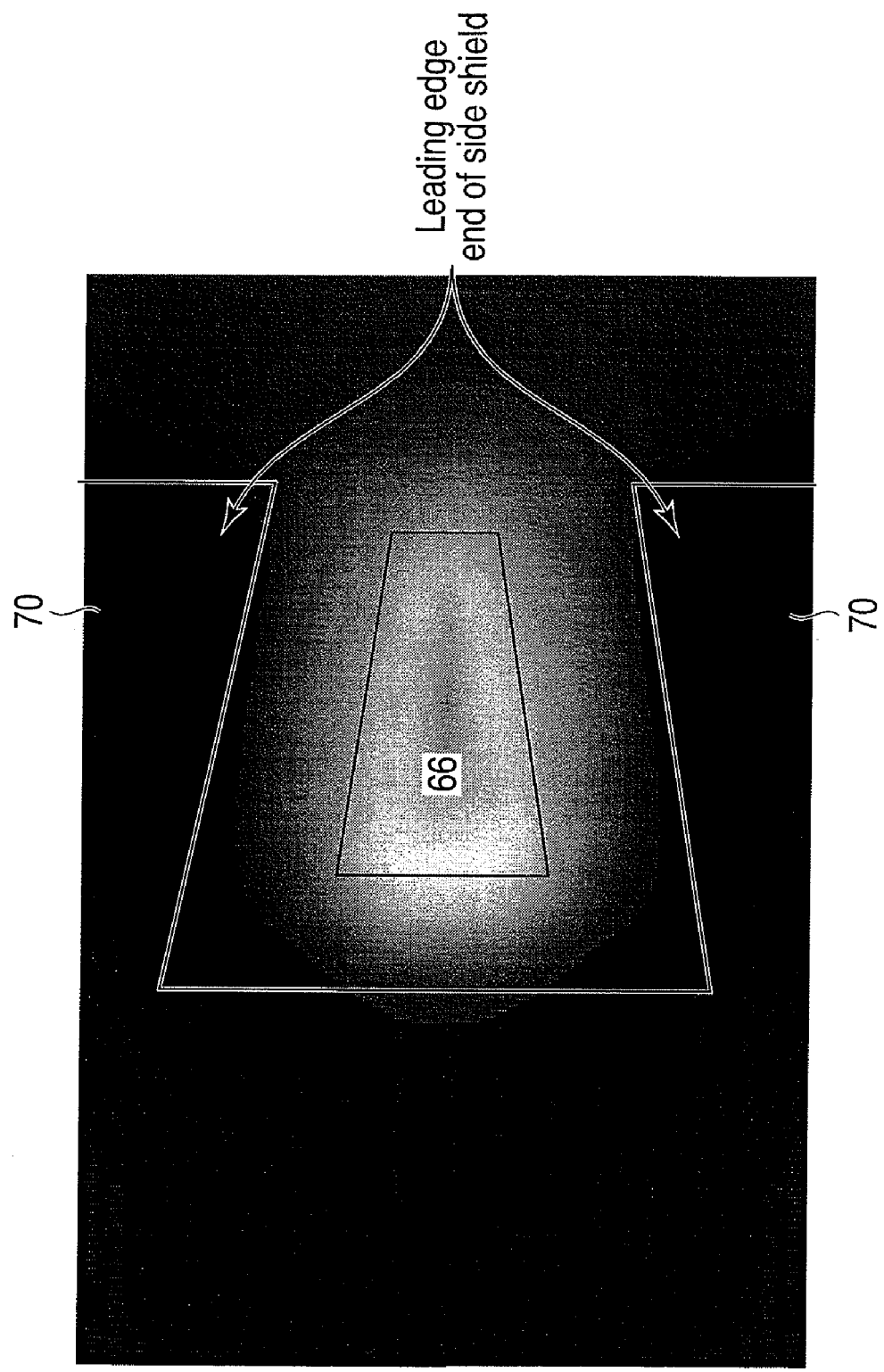
FIGS. 7A and 7B are exemplary diagrams comparatively showing the respective magnetic field distributions of the recording heads of the comparative example and present embodiment.

FIG. 7A shows a distribution of magnetic fields applied to a double-layered perpendicular recording medium just below the vicinity of the main pole 66 observed in the case where information is recorded to the recording medium by means of the magnetic head according to the comparative example. In FIG. 7A, the whiteness represents the intensity of magnetic fields that are applied from the recording-head side toward the recording medium, while the blackness represents magnetic fields that return from the medium side toward the recording head. The magnetic fields just below the main pole 66 are whitish, while the ones located corresponding to the side shields 70 are blackish, thus indicating opposite movements of the incoming and outgoing magnetic fields. The magnetic fields at the end portions on the leading side of the side shields 70 are particularly blackish, which indicates that the reverse magnetic fields are strong. Thus, in the magnetic head according to the comparative example, the information recorded in the recording medium is degraded by the reverse magnetic fields just below the vicinity of the side faces of the side shields 70.

Thus, in the magnetic head according to the comparative example combined with the double-layered perpendicular recording medium, magnetic fields from the main pole 66 having passed through the soft magnetic underlayer produce magnetic fields that flow from the underlayer into the side shield 70. Thereupon, recording information on the adjacent tracks is degraded by the magnetic fields reverse to the ones just below the main pole. Degradation of signals on the adjacent tracks is accelerated by the concentration of magnetic fluxes on the respective leading end portions of the side shields 70, in particular.

Figure 7B:
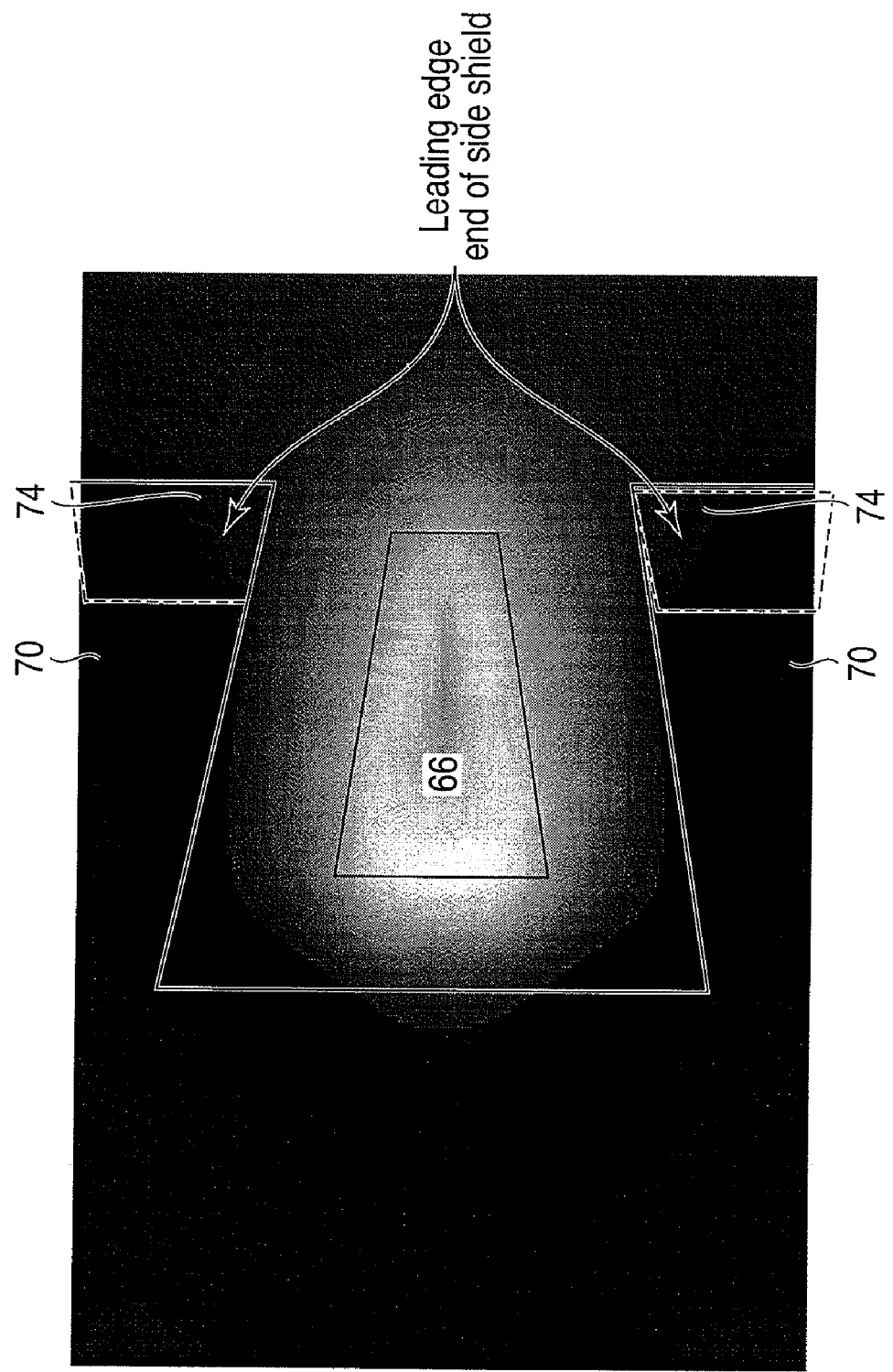

On the other hand, FIG. 7B shows a distribution of magnetic fields applied to the recording medium just below the vicinity of the main pole 66 of the magnetic head according to the present embodiment. While magnetic fields just below the main pole 66 are whitish, ones just below the side shields 70 are blackish. Magnetic fields at the main pole side end portions on the leading side of the side shields 70 are grayish. Thus, it is indicated that both positive and negative magnetic fields perpendicular to the recording medium surfaces are suppressed.

Figure 8:
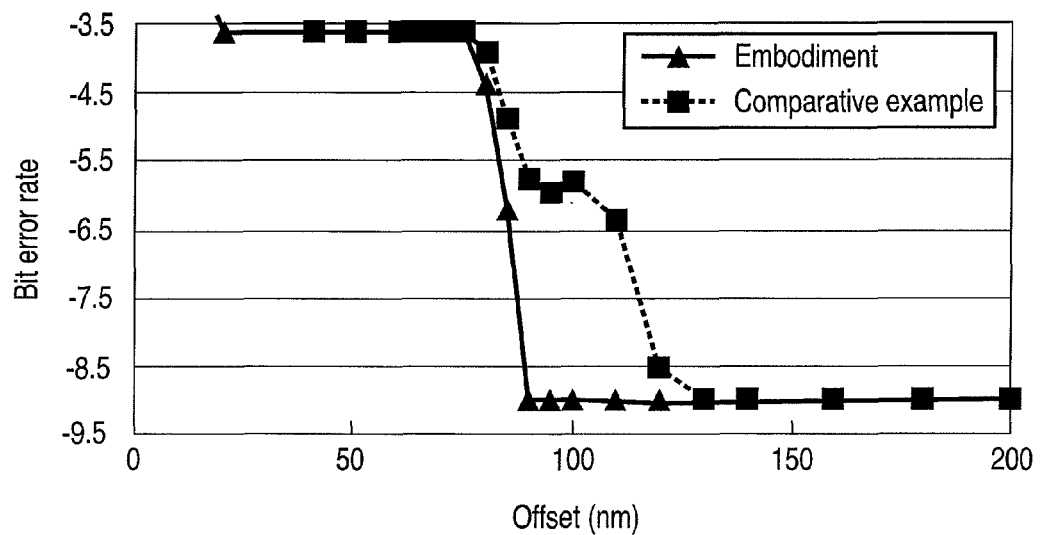
FIG. 8 is an exemplary diagram comparatively showing the relationships between the respective offsets and bit error rates of the present embodiment and comparative example.

FIG. 8 shows graphs representative of the relationships between bit error rates and offsets for comparison between the present embodiment and comparative example. A bit error rate is indicative of the percentage of unreadable original signals obtained when the original signals are reproduced by returning each magnetic head to the position of a first track after the performance of 1,000 recording cycles with the head kept off the tracks transversely relative thereto. The recording is performed after random signals are written in arbitrary track positions on the recording medium by the magnetic head. In FIG. 8, it is indicated that higher-density recording can be achieved with a smaller track pitch if the bit error rate does not change despite a reduction in the offset.

If the position of the first track is assumed to be 0, the bit error rate is improved as the offset increases. The smaller the offset with fewer bit errors, the fewer the erased adjacent tracks are. This arrangement can be said to be suitable for higher-density recording. In the magnetic head according to the comparative example, the bit error rate is poor in positions with the offset of 110 nm or less. This is because the return magnetic field is concentrated on the leading end of each side shield 70, as mentioned before.

According to the magnetic head of the present embodiment, on the other hand, the bit error rate is not degraded with the offset of about 90 to 110 nm, which proves effective for higher-density recording in the recording medium.

Figure 9:
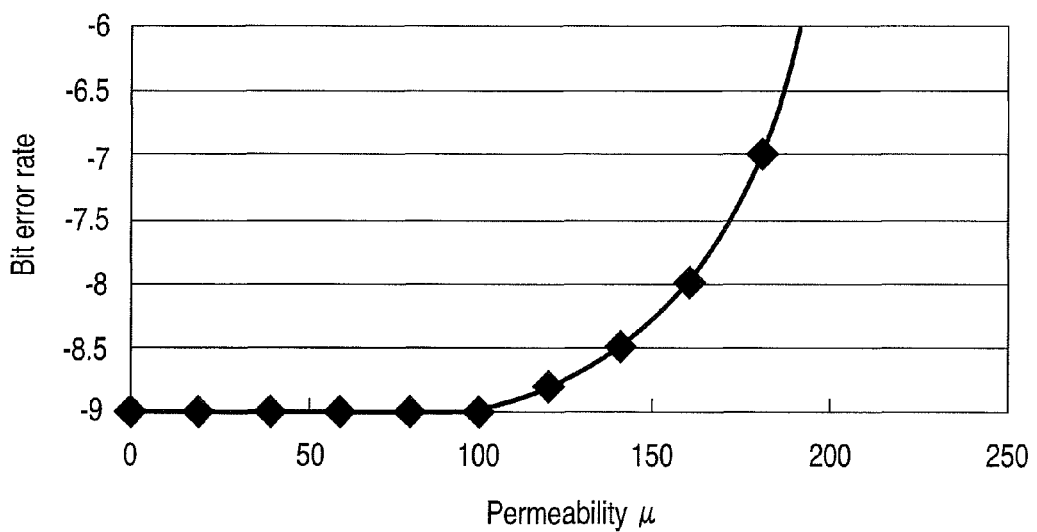
FIG. 9 is an exemplary diagram showing the relationship between the permeability and bit error rate.

FIG. 9 shows the relationship between the permeability $\mu$ and bit error rate at points where the offset is 100 nm. As seen from FIG. 9, the bit error rate is sharply worsened in the area where the permeability $\mu$ is 100 or more. For the magnetic head according to the present embodiment, therefore, it can be understood that the effective permeability $\mu$ of the low-permeability layer 74 is $\mu<100$.

Thus, according to the magnetic head of the present embodiment, higher track densities can be achieved without degrading the quality of signals just below the side shields 70, that is, on the adjacent tracks.

Figure 10:
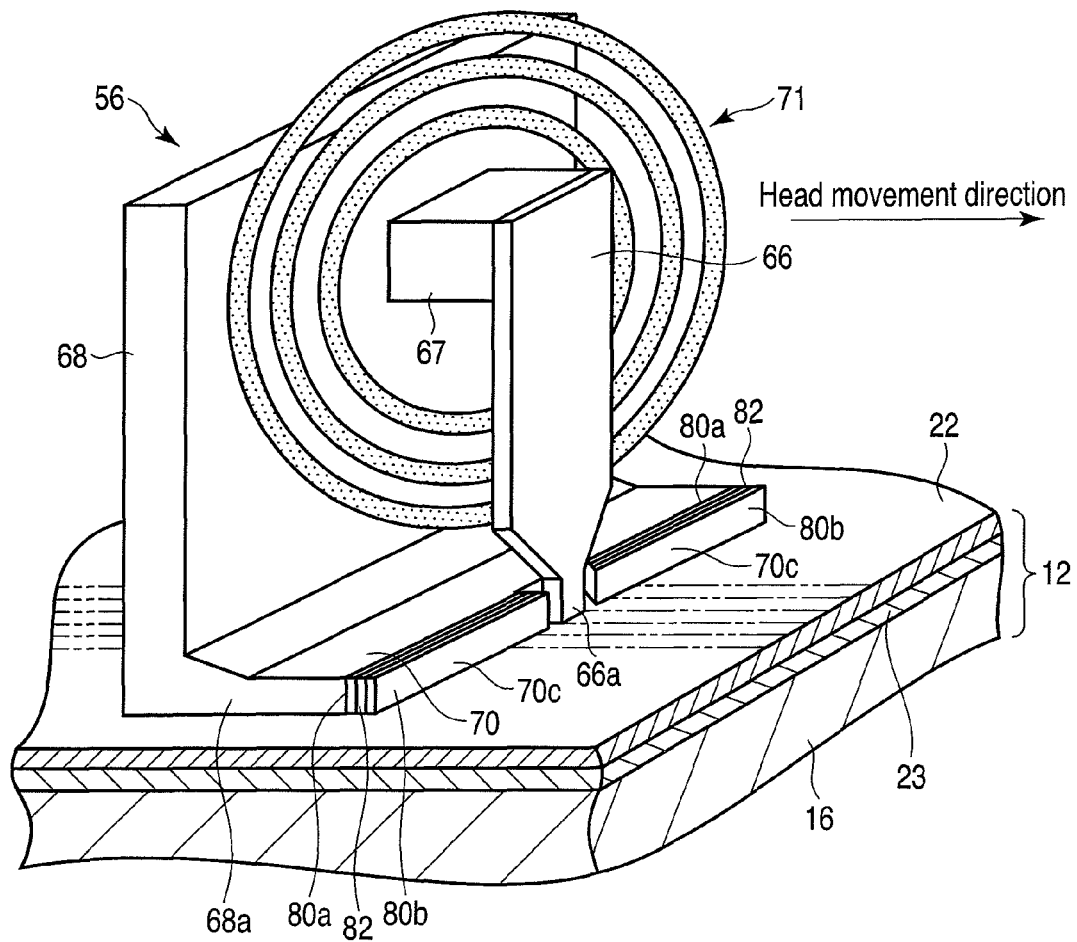
FIG. 10 is an exemplary perspective view typically showing a recording head of a magnetic head according to a second embodiment.

The following is a description of a magnetic head of an HDD according to a second embodiment. FIG. 10 is an exemplary perspective view typically showing a recording head of a head section, and FIG. 11 is an exemplary plan view of a main pole tip portion and side shields of the recording head section taken from the disk-facing side.

Figure 11:
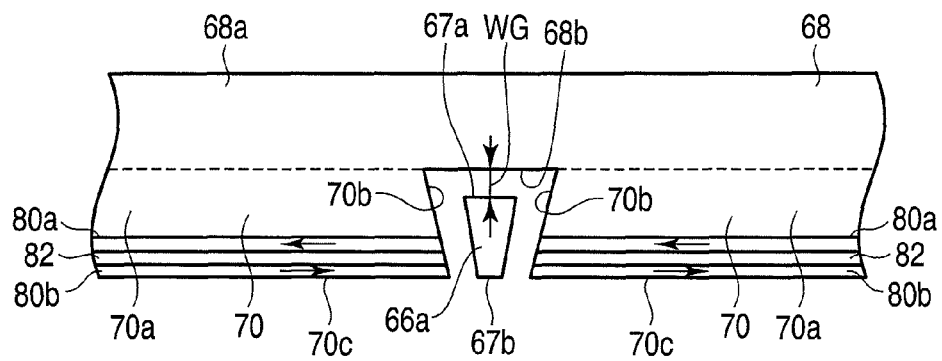
FIG. 11 is an exemplary plan view of the recording head of the second embodiment taken from the disk-facing side of a slider.

According to the second embodiment, as shown in FIGS. 10 and 11, a magnetic disk 12 is a double-layered perpendicular recording medium, comprising a soft magnetic underlayer 23 and perpendicular magnetic recording layer 22, which are sequentially formed on a substrate 16. The recording layer 22 has an easy axis perpendicular to the disk surfaces. The magnetic head is a separation-type magnetic head in which recording and reproducing heads are separate from each other. A recording head 56 comprises a main pole 66, write/shield pole 68, junction 67, and recording coil 71. The main pole 66 is formed of a soft magnetic material with a high permeability and high saturation magnetic flux density that produces a recording magnetic field perpendicular to the surfaces of the magnetic disk 12. The write/shield pole 68 is located on the trailing side of the main pole 66 and configured to efficiently close a magnetic path through the soft magnetic underlayer 23 just below the main pole. The junction 67 connects an upper part of the main pole 66 to the write/shield pole 68. The recording coil 71 is located so as to wind around the magnetic path including the main pole 66 and write/shield pole 68 in order to pass a magnetic flux through the main pole. The main pole 66 extends at right angles to the surfaces of the magnetic disk 12. The lower end portion of the main pole 66 on the disk side is tapered toward the disk 12, and its tip portion 66a is in the form of a column narrower than the other part.

The recording head 56 comprises a pair of side shields 70 disposed individually on the opposite sides of the main pole 66 transversely relative to the tracks. On a disk-facing surface 43, the side shields 70 are magnetically separated from the main pole 66. The side shields 70 are formed of a soft magnetic material with a high permeability and high saturation magnetic flux density. The side shields 70 are formed integrally with a lower end portion 68a of the write/shield pole 68 and extend from a leading end face 68b of the lower end portion 68a toward the leading end side of a slider 42.

Soft magnetic layers 80a and 80b and a nonmagnetic layer 82 sandwiched therebetween are laminated in the direction of movement of the magnetic head at a leading end 70c of each side shield 70, thereby forming a laminated structure. The soft magnetic layers 80a and 80b are formed of an alloy containing, for example, iron, cobalt, nickel, or zirconium, while the nonmagnetic layer 82 is formed of, for example, ruthenium, tantalum, copper, or tungsten. The soft magnetic layers 80a and 80b each have an easy axis extending transversely relative to the tracks and are magnetized in an antiparallel manner. Thus, the soft magnetic layers 80a and 80b are antiferromagnetically coupled parallel to the layer surfaces and transversely relative to the tracks with the nonmagnetic layer 82 between them. These three layers form an antiferromagnetically-coupled layer. The soft magnetic layers 80a and 80b between which the nonmagnetic layer 82 is sandwiched may be formed as a multilayer laminated structure. Preferably, the permeability μ of the antiferromagnetically-coupled layer should be μ<100. The direction of the antiferromagnetic coupling is not limited to the direction transversely relative to the tracks and may be another direction. Since other configurations of the magnetic head and HDD are the same as those of the first embodiment, like reference numbers are used to designate like parts throughout the several views, and a detailed description of those parts is omitted.

FIG. 12 is an exemplary diagram showing the relationship between bias magnetic fields and permeability and indicates that a bias magnetic field Hb should preferably be Hb >60 Oe. FIG. 13 is a diagram showing the relationship between an applied magnetic field H and produced magnetization M. In FIG. 13, the range of the bias magnetic field Hb is indicated by an arrow. An inclination represented by a dotted line is called an effective permeability, which is lower than that obtained when the bias magnetic field is Hb=0. If the applied magnetic field is fixed, therefore, the produced magnetization is lower in the presence of Hb. Consequently, the effective permeability p of the antiferromagnetically-coupled layer can be reduced by means of the bias magnetic field.

Thus, the antiferromagnetically-coupled layer on the leading end of each side shield 70 can reduce the permeability of the leading end portion, thereby providing the same functions and effects as those of the first embodiment.

The following is a description of a magnetic head of an HDD according to a third embodiment. FIG. 14 is an exemplary perspective view typically showing a recording head of a head section, and FIG. 15 is an exemplary plan view of a main pole tip portion and side shields of the recording head section taken from the disk-facing side.

According to the third embodiment, as shown in FIGS. 14 and 15, a nonmagnetic layer 82 and soft magnetic layer 80 are laminated in the direction of movement of the magnetic head at a leading end 70c of each of side shields 70 of a recording head 56, thereby forming a laminated structure. The soft magnetic layer 80 is formed of an alloy containing, for example, iron, cobalt, nickel, or zirconium, while the nonmagnetic layer 82 is formed of, for example, ruthenium, tantalum, copper, or tungsten. The side shields 70 and soft magnetic layer 80 each have an easy axis extending transversely relative to the tracks and are magnetized in an antiparallel manner. Thus, the side shields 70 and soft magnetic layer 80 are antiferromagnetically coupled parallel to the layer surfaces and transversely relative to the tracks with the nonmagnetic layer 82 between them. These three layers form an antiferromagnetically-coupled layer.

The soft magnetic layer 80 may be formed as a multilayer laminated structure. Preferably, the permeability μ of the antiferromagnetically-coupled layer should be μ<100. The direction of the antiferromagnetic coupling is not limited to the direction transversely relative to the tracks and may be another direction. As shown in FIG. 12, the bias magnetic field Hb should preferably be Hb >60 Oe. Since other configurations of the magnetic head and HDD are the same as those of the first embodiment, like reference numbers are used to designate like parts throughout the several views, and a detailed description of those parts is omitted.

The antiferromagnetically-coupled layer on the leading end of each side shield 70 can reduce the permeability of the leading end portion, thereby providing the same functions and effects as those of the first embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, the materials of the constituent elements of the recording head are not limited to the embodiments described above and may be changed as required. The value of the saturation magnetic flux density of each constituent element is not limited to the foregoing embodiments and may be changed as required. The materials, shapes, sizes, etc., of the constituent elements of the head section may be changed if necessary. In the magnetic disk drive, moreover, the numbers of magnetic disks and heads may be varied as required, and the size of the magnetic disks may also be variously selected.

What is claimed is:

1. A magnetic head for perpendicular recording comprising:
    a slider comprising a facing surface opposed to the recording medium; and
    a head section on the slider, configured to perform information processing for the recording medium,
    wherein the head section comprises
    a main pole configured to apply a recording magnetic field perpendicular to the recording medium,
    a recording coil configured to excite the main pole,
    a write and shield pole opposed to a trailing side of the main pole across a write gap, and
    side shields on opposite sides of the main pole transversely relative to a track to face side faces of the main pole and magnetically separated from the main pole,
    wherein a part of a side face of each side shield opposed to each corresponding side face of the main pole which is located at the shortest distance from a leading end of each side face of the main pole, on the facing surface, comprises a permeability lower than that of another part of the side shield.

2. The magnetic head of claim 1, wherein the head section comprises a low-permeability layer with a permeability less than 100 formed on a leading end of each side shield.

3. The magnetic head of claim 1, wherein the head section comprises a laminated structure on the leading end side of each side shield, the laminated structure comprising a nonmagnetic layer and a soft magnetic layer laminated in the direction of movement of the magnetic head, wherein the side shields and the soft magnetic layer each have an easy axis extending transversely relative to the track and are magnetized in an antiparallel manner, and wherein the magnetic layer and each side shield are antiferromagnetically coupled to each other with the nonmagnetic layer therebetween.

4. The magnetic head of claim 1, wherein the head section comprises a laminated structure on the leading end side of each side shield, the laminated structure comprising a first soft magnetic layer, a nonmagnetic layer, and a second soft magnetic layer laminated in the direction of movement of the magnetic head, wherein the first and second soft magnetic layers each have an easy axis extending transversely relative to the track and are magnetized in an antiparallel manner, and wherein the first and second magnetic layers are antiferromagnetically coupled to each other with the nonmagnetic layer therebetween.

5. A disk drive comprising:
   a disk recording medium;
   a drive unit configured to rotate the recording medium; and
   a magnetic head comprising a slider comprising a facing surface opposed to the recording medium and a head section on the slider, configured to perform information processing for the recording medium,
   wherein the head section comprises
   a main pole configured to apply a recording magnetic field perpendicular to the recording medium,
   a recording coil configured to excite the main pole,
   a write and shield pole opposed to a trailing side of the main pole across a write gap, and
   side shields on opposite sides of the main pole transversely relative to a track to face side faces of the main pole and magnetically separated from the main pole,
   wherein a part of a side face of each side shield opposed to each corresponding side face of the main pole which is located at the shortest distance from a leading end of each side face of the main pole, on the facing surface, comprises a permeability lower than that of another part of the side shield.

6. The disk drive of claim 5, wherein the head section comprises a low-permeability layer with a permeability less than 100 formed on a leading end of each side shield.

7. The disk drive of claim 5, wherein the head section comprises a laminated structure on the leading end side of each side shield, the laminated structure comprising a nonmagnetic layer and a soft magnetic layer laminated in the direction of movement of the magnetic head, wherein the side shields and the soft magnetic layer each have an easy axis extending transversely relative to the track and are magnetized in an antiparallel manner, and wherein the magnetic layer and each side shield are antiferromagnetically coupled to each other with the nonmagnetic layer therebetween.

8. The disk drive of claim 5, wherein the head section comprises a laminated structure on the leading end side of each side shield, the laminated structure comprising a first soft magnetic layer, a nonmagnetic layer, and a second soft magnetic layer laminated in the direction of movement of the magnetic head,
   wherein the first and second soft magnetic layers each have an easy axis extending transversely relative to the track and are magnetized in an antiparallel manner, and
   wherein the first and second magnetic layers are antiferromagnetically coupled to each other with the nonmagnetic layer therebetween.

* * * * *